Sept. 3, 1968   T. J. ROWLANDS ETAL   3,400,303
LAMINATED BUS ARRANGEMENT FOR ELECTRICAL DISTRIBUTION SYSTEMS
Filed May 15, 1967   15 Sheets-Sheet 1

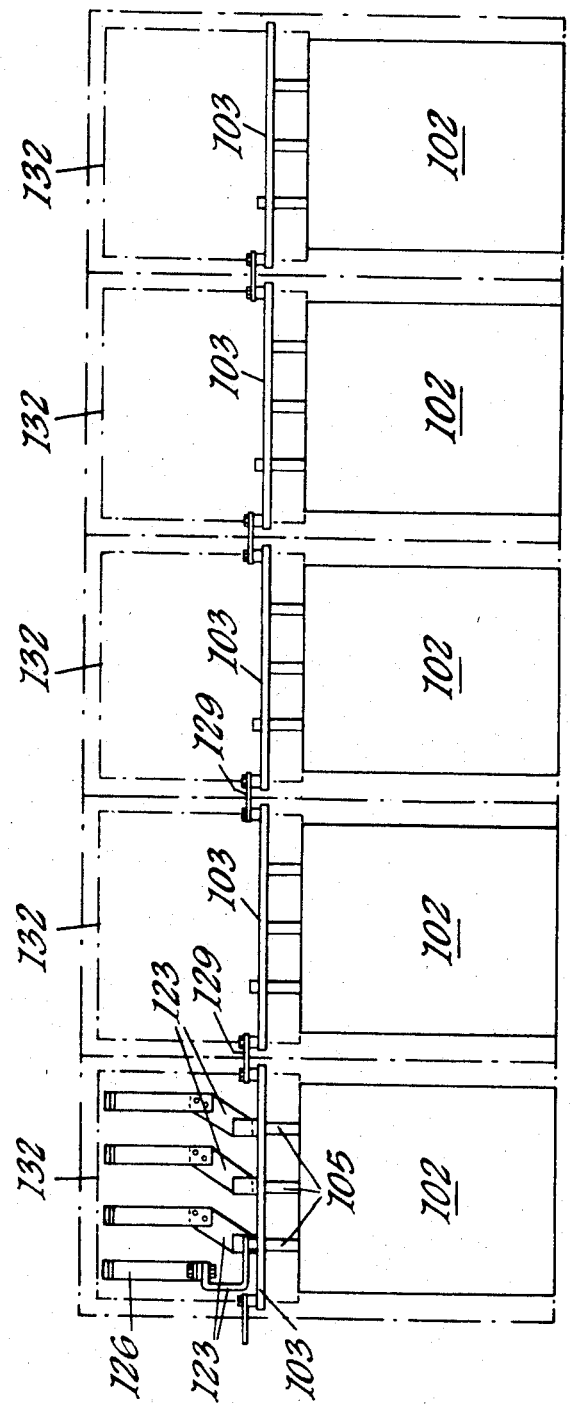

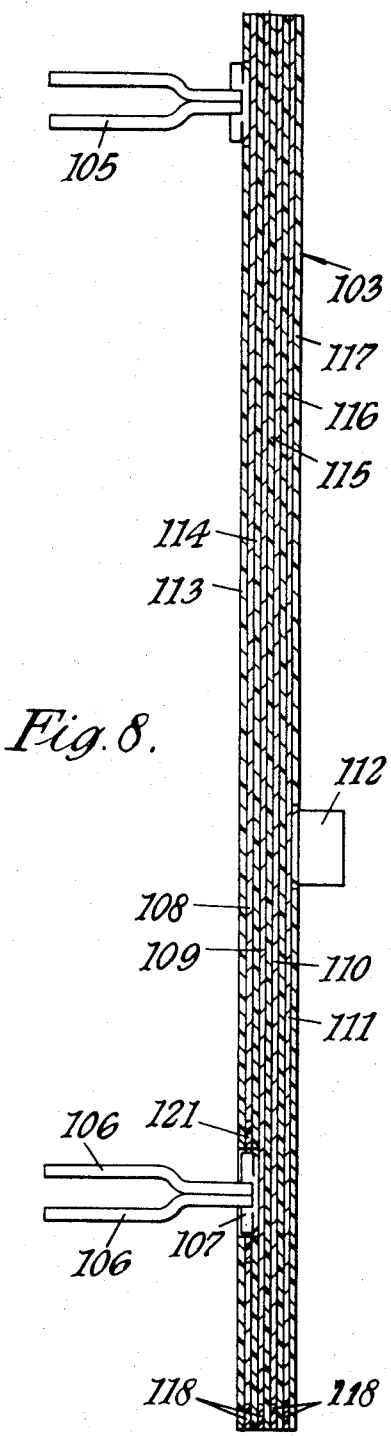
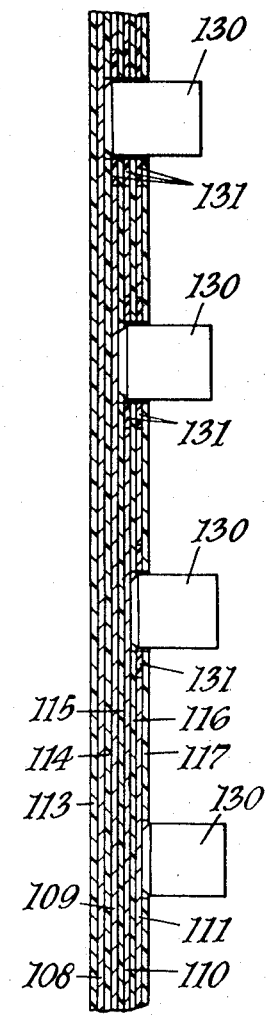
Fig. 8.
Fig. 9.

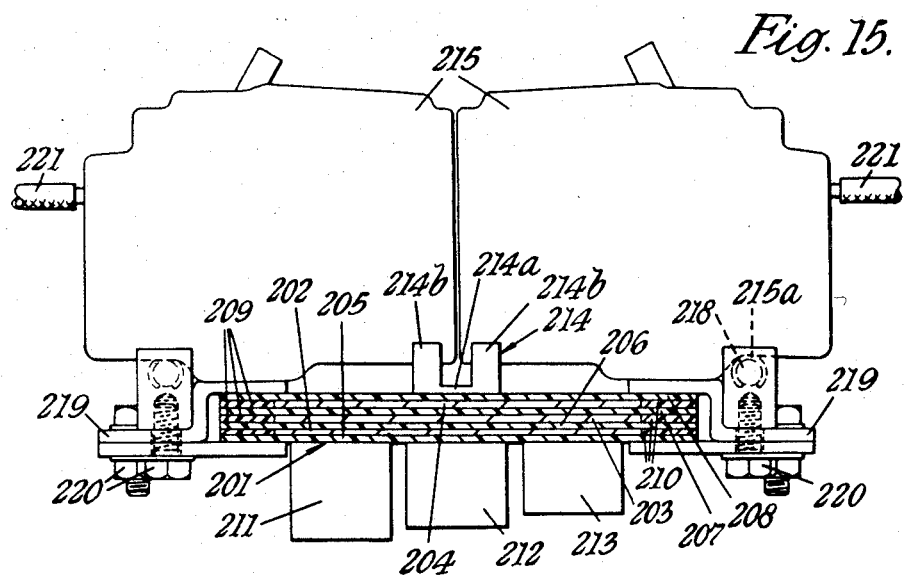
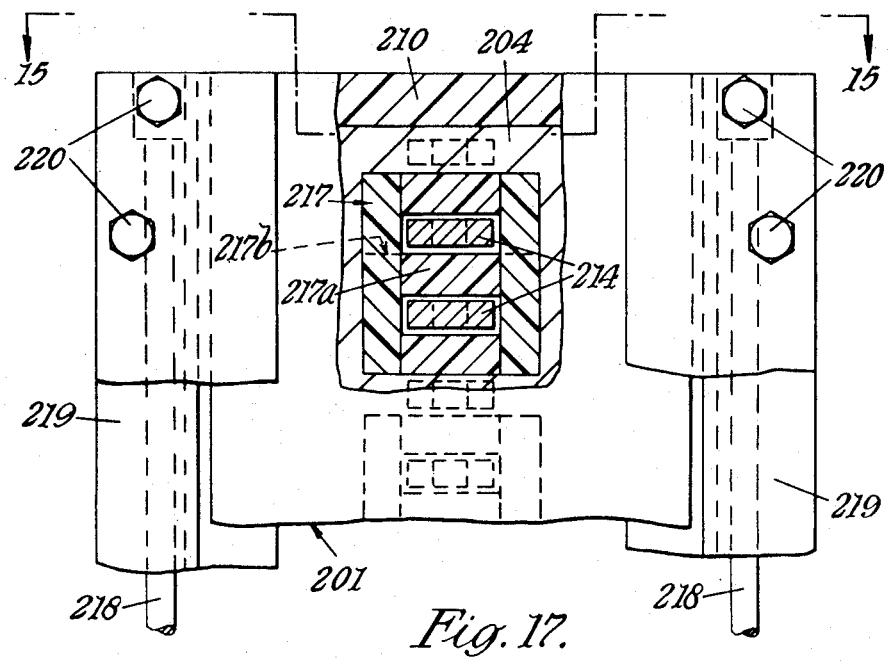

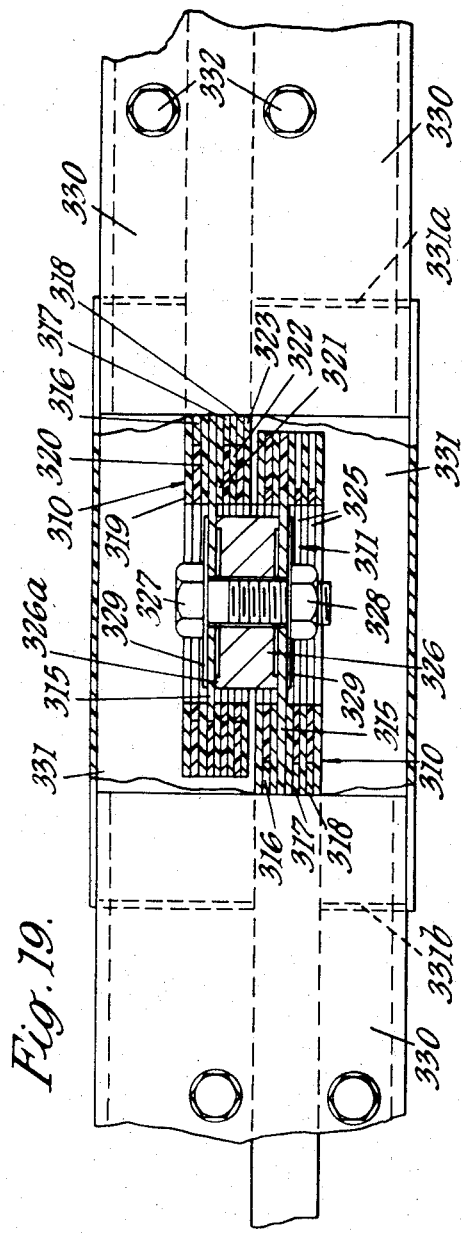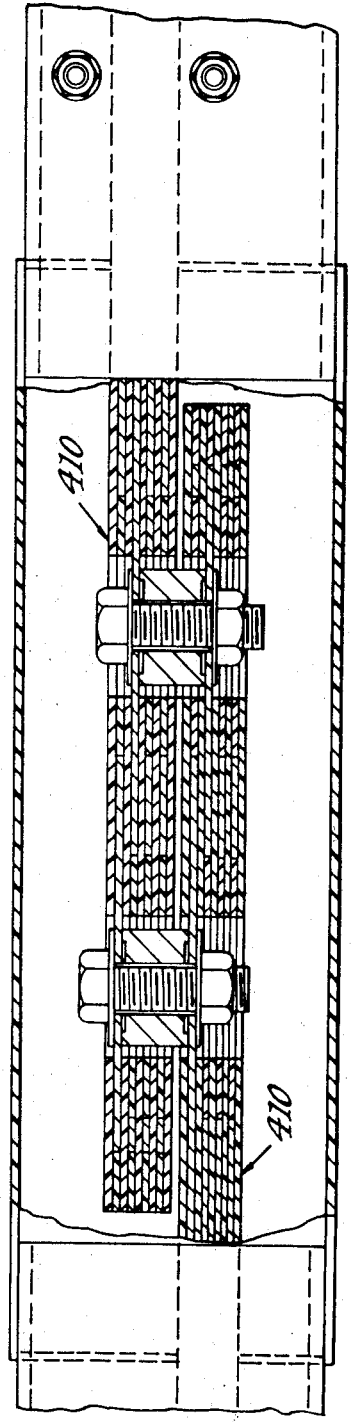

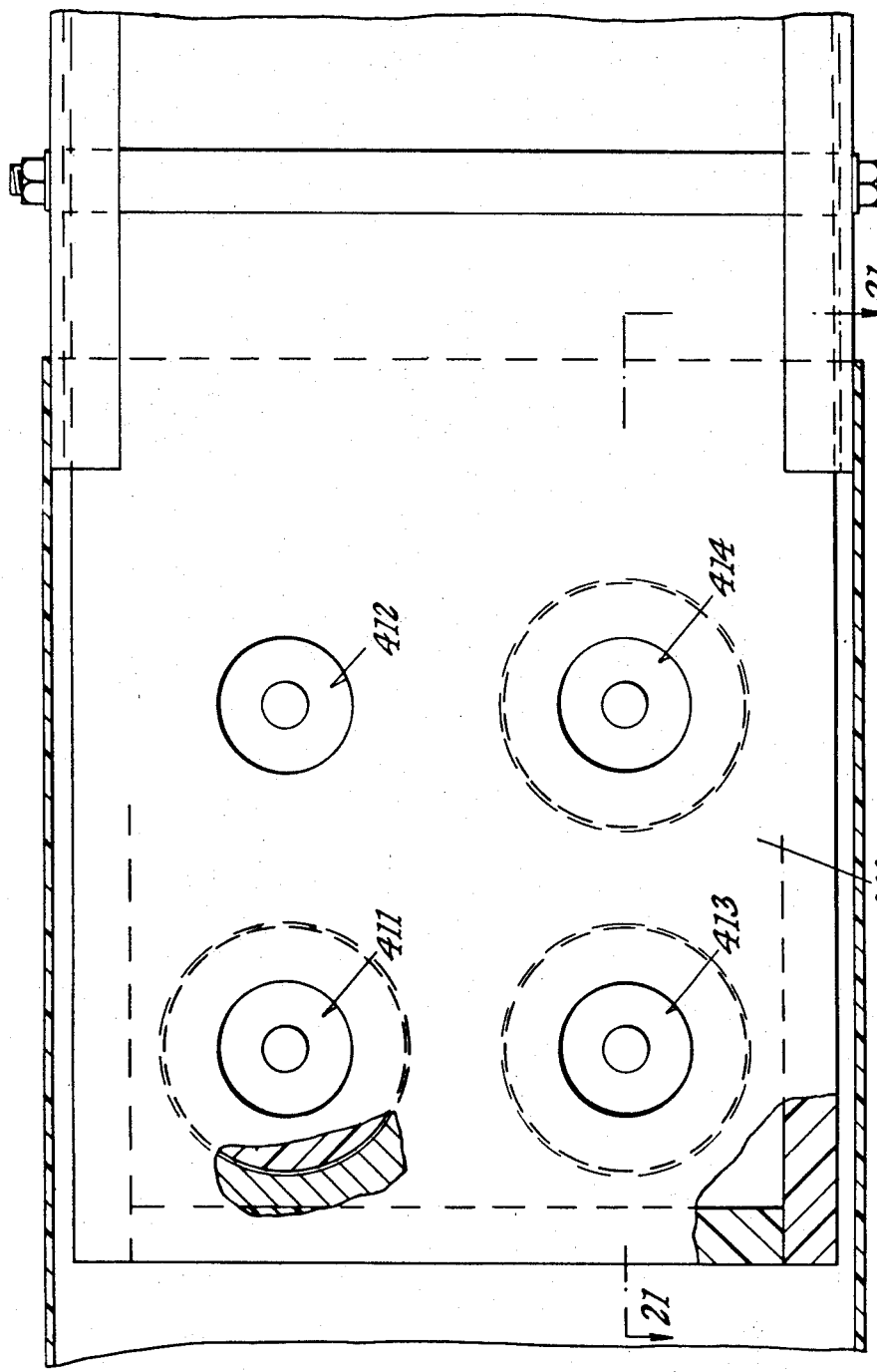

United States Patent Office 3,400,303
Patented Sept. 3, 1968

3,400,303
LAMINATED BUS ARRANGEMENT FOR ELECTRICAL DISTRIBUTION SYSTEMS
Thomas J. Rowlands, Bidford-on-Avon, and Ivan F. Smart, Sutton Coldfield, England, assignors to George Ellison Limited, Birmingham, England
Continuation-in-part of application Ser. No. 523,392, Jan. 27, 1966. This application May 15, 1967, Ser. No. 638,483
24 Claims. (Cl. 317—119)

ABSTRACT OF THE DISCLOSURE

Laminated bus arrangements are employed both for switch and circuit breaker panel boards and for bus bar trunking. The laminated bus utilize thin sheet metal conductors interposed between insulating layers. The edges of the conductors are protected by flat strips sandwiched between the insulating layers and connections to the conductors are made through holes in the insulating layers. Where a connection is made to a conductor not adjacent either surface of the laminate, an enlarged hole is made in the overlying conductor and a washer or gasket is positioned in this hole between the adjacent insulating layers.

---

This is a continuation-in-part of Ser. No. 523,392 filed Jan. 27, 1966, now abandoned.

This invention is concerned with electrical distribution systems, that is to say with electrical distribution switch boards whereat the control of current flow from a poly-phase main supply to a plurality of individual circuits—either poly-phase or single phase is effected, and with bus bar trunking (or bus duct as it is sometimes known) whereby electrical power is transmitted in a distribution system.

The invention has among its objects to provide:

(a) a convenient form of laminated bus assembly for use in switchboards and in bus bar trunking,
(b) convenient and effective methods of assembling such laminated bus assemblies,
(c) novel switchboard constructions, and
(d) improved bus bar trunking arrangements.

In so far as the invention is concerned with a laminated bus assembly, it provides a construction in which the electrical insulation problems associated with laminated bus assemblies are extremely conveniently solved.

The assembly consists of interleaved layers consisting alternately of conductive sheets and insulating material, these layers being firmly bonded together to provide a laminate of great mechanical strength. The insulating layers are of greater surface dimensions than the conductive sheets so that the insulating layers project beyond the conductive sheets around the whole periphery of the laminate. The spaces between the insulating layers are filled by strip means interleaved with and bonded to the insulating layers. Connections to the conductive sheets are made at positions spaced from the edges of the laminate, a particular conductor having a selected area exposed through aligned holes in the overlying insulating layers and in any overlying conductive sheets. The holes in the conductive sheets are larger than those in the insulating layers and washer means are disposed in the holes in the conductors interposed between the adjacent insulating layers where these project beyond the holes in the conductive sheet.

It will be seen that the arrangement described above is such that each conductive sheet is totally enclosed in insulation material except where its face is deliberately exposed for connection. In addition the manner in which the edges of the conductors are enclosed in insulation material (both at the periphery of the laminate and at any holes in the conductors) is such that electrical isolation of the conductors is maintained under all conditions.

The methods of manufacturing the laminates referred to above are twofold. Firstly, the currently preferred method consists of assembling the laminate from separate sheets, strips and washers of insulating material. The laminate is built up, layer by layer. The alternative method consists of supporting the conductive sheets in spaced relation and then moulding or casting the insulation material with the sheets as inserts. This method produces a laminate in which at least the washer portions, if not also the strip means, are integral with the insulating layers.

In accordance with the switchboard aspect of the invention, a laminate as described above is used to connect the phases of a poly-phase supply to the terminals of a plurality of single or poly-phase switches. The laminate completely replaces the conventional air spaced bus bar systems usually employed in switchboards and valuable savings in conductor usage can be obtained. Conventionally the board may consist of a plurality of tiers of switches arranged along the board. In such an arrangement, using air-spaced bus bars, there would conventionally be a main array of bus bars running along the board with "risers" connected to the bus bars at intervals for connecting the switches of a given cell or column of the board. With the present invention each cell has its own laminate and the laminates are interconnected. Thus the laminates serve both as bus bars and as risers as well as giving improved performance characteristics.

When the laminates according to the invention are used in bus bar trunking for power transmission various arrangements are employed for interconnecting the respective conductors of adjacent laminates. The laminates may be arranged in end-to-end co-planar relationship with connecting links arranged out of the plane of the laminates. Alternatively the laminates may be arranged in overlapping relationship with connecting members interposed to form the electrical connections.

Reference is now made to the accompanying drawings in which examples of the various aspects of the invention are illustrated. In the drawings:

FIGURE 1 is a side view of a four tier switchboard cell shown partially in section;
FIGURE 2 is a perspective view of a laminate used in the switchboard;
FIGURE 3 is an enlarged fragmentary section on line 3—3 in FIGURE 2;
FIGURE 4 is an enlarged fragmentary section on line 4—4 in FIGURE 2;
FIGURE 5 is a plan view showing the coupling of two assemblies from adjacent cells of the switchboard;
FIGURE 6 is a side view of a single cell of a two tier switchboard;
FIGURE 6a is a diagrammatic plan view of a switchboard incorporating a row of cells like that shown in FIGURE 6, with structural detail largely omitted for the sake of clarity;
FIGURE 7 is a rear elevation, partly in section, of the laminate utilised in the switchboard of FIGURE 6;
FIGURE 8 is a fragmentary section on line 8—8 in FIGURE 7;
FIGURE 9 is a fragmentary section on line 9—9 in FIGURE 7;
FIGURE 10 is a plan view of a jig used in the construction of the laminate of FIGURES 7 to 9;
FIGURE 11 is a fragmentary section on line 11—11 of FIGURE 10;

FIGURE 15 is a cross-section of a miniature circuit breaker panel board;

FIGURE 17 is a rear view of the other end of the panel board, partly in section and showing the line 15—15 on which the section of FIGURE 15 is taken;

FIGURE 19 is a section through a joint between laminates in bus bar trunking with laminates as shown in FIGURE 18;

FIGURE 20 is an elevation, partly in section, of a different laminate for bus bar trunking;

FIGURE 21 is a section through a joint between laminates as shown in FIGURE 20, the section being effectively taken on line 21—21 in FIGURE 20;

Figure 1:
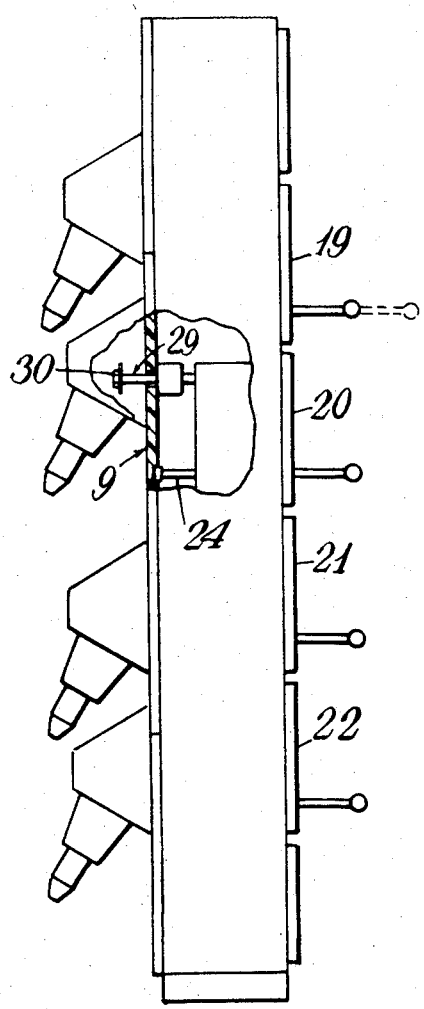
Figure 4:
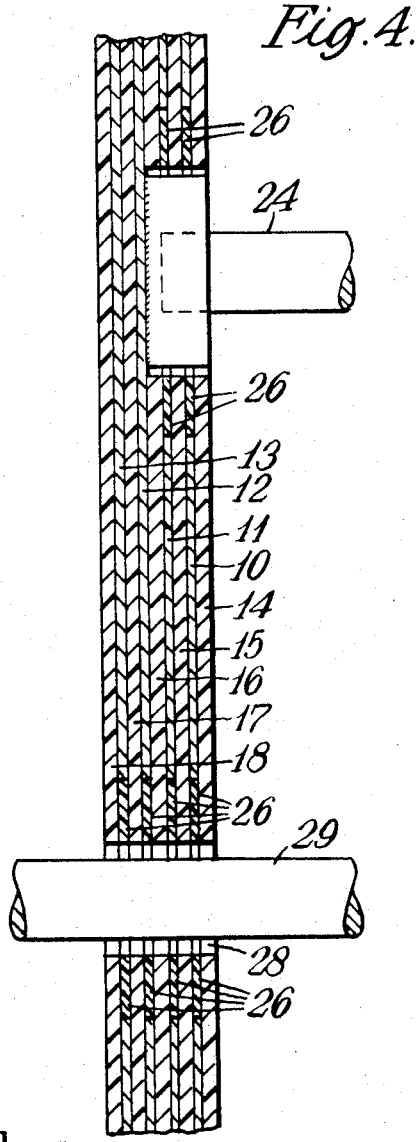
Figure 3:
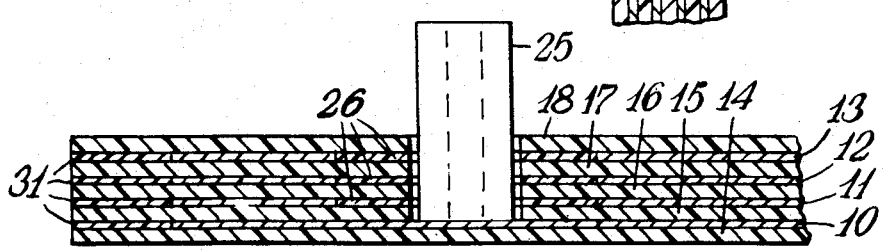
Figure 2:
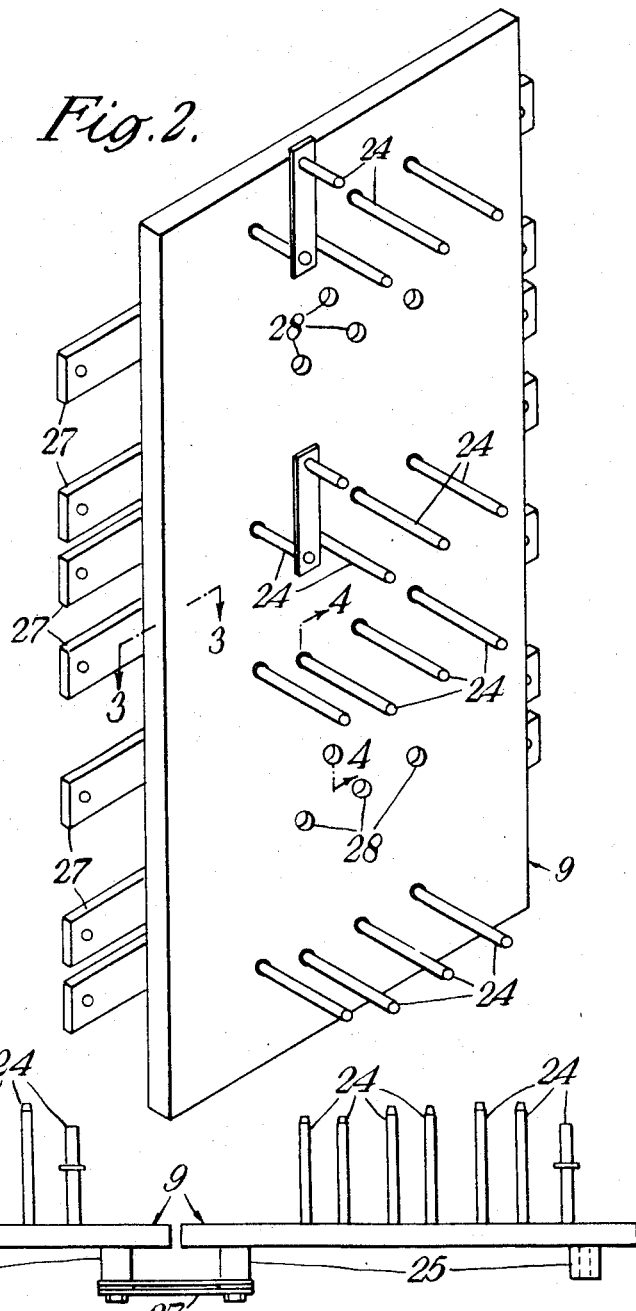
Figure 5:
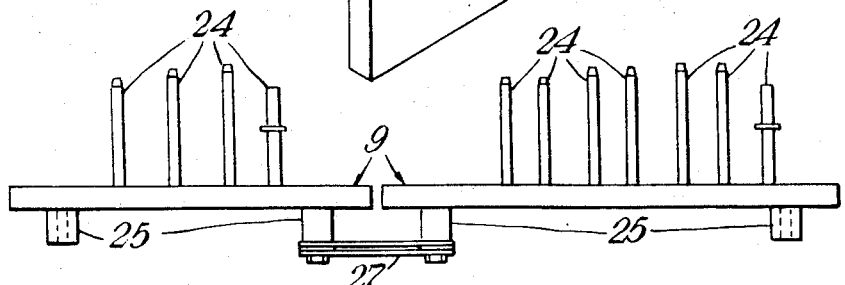

Referring firstly to the embodiment of the invention shown in FIGURES 1 to 5, the electrical switchboard includes a laminated assembly 9 of conductive sheets and insulating layers. There are, in fact, four conductive sheets 10, 11, 12, 13 (which may conveniently be formed of thin copper) and give insulating layers 14, 15, 16, 17, 18 are employed. These layers may be formed of the material known as Tufnol (registered trademark) or from any other suitable sheet material.

The laminated assembly is associated with a plurality of switches 19, 20, 21, 22 in the distribution board and, where necessary, is linked with one or more adjacent laminated assemblies. The connections to the various conductive sheets are made by means of stems or like connectors 24, 25 which are secured to the conductive sheets (for example, by brazing) before the laminations are assembled. Thus each conductive sheet will have some stems or like connectors 24 projecting in one direction from positions spaced from the edges of the sheet and may also have one or more stems 25 projecting in the opposite direction from positions adjacent one to each edge of the sheet. The former stems 24 are in the form of elongated rods and serve as connections for the switches 19, 20, 21 and 22 whilst the latter stems 25 which are in the form of relatively short sleeves, are used to form interconnections between adjacent assemblies.

As will be realised, when the laminations are assembled it is required that all of the switch stems 24 will pass through holes in one outer layer 14 of insulating material, whilst all the sleeve stems 25 will have to pass through the other outer layer 18. Similarly all the switch stems 24 excepting those secured to the conductive sheet 10 adjacent the first-mentioned outer layer 14, will have to extend through this conductive sheet 10, and so on. Thus each sheet or layer is formed with apertures arranged in a predetermined pattern to receive the various stems 24, 25. The apertures in the conductive sheets are of larger diameter than those in the insulating layers and each contains a flat annular ring 26 of the insulating material.

The edges of the conductive sheets 10, 11, 12, 13 are protected by flat strips of insulating material 31.

In use the various laminated assemblies of the distribution board are interconnected by metal links 27 secured to the aforementioned sleeve stems 25. The laminated assemblies may, in fact, form part of the back panelling of the switchboard whilst the front panelling or a suitable framework support the switches 19, 20, 21, 22. These latter are so arranged as to have their terminals (not shown) secured directly to the stems. The output connections 29 of at least some of the switches may extend backwardly through further apertures 28 in the laminated assemblies and would then be in the form of rigid rods. The output terminals 30 of the switchboard would be arranged on the back panelling of the switchboard.

It will be noted that the only bare conductors at the back of the switchboard are the output terminals 30 themselves and the links 27 interconnecting adjacent laminated assemblies 9. It is a relatively simple matter to provide separate removable insulating covers (not shown) for each set of output terminals and each set of links. Thus the rear of the switchboard is completely insulated and, when any given switch is off the associated terminals 30 can be uncovered and worked upon without danger.

It will also be noted that the only non-permanent connections are those between the stems 25 and the links 27, between the stems 24, and the switches 19, 20, 21, 22, and between the switches 19, 20, 21, 22 and the output terminals 30. These connections are all readily accessible either from the front or from the rear of the switchboard.

It has also been found from tests conducted on prototypes that the laminated assembly has other important advantages. For example it has been found that prolonged high current passed through the conductive sheets does not cause such a high temperature rise as would occur in an equivalent arrangement of bus bars (i.e. an arrangement of bars capable of distributing current to switches etc., arranged in a similar fashion to the arrangement of switches in the test and employing an equivalent quantity of copper). This lower temperature rise is thought to arise for two reasons—firstly, that there is no "skin effect" to restrict the effective cross-sectional area of the current path, and secondly, that the extended surfaces of the assembly can dissipate heat more rapidly than the comparatively small surface area available from bus bars, and thirdly because a direct route is provided for the current.

In the design of bus bar systems two effects of possible short-circuits have to be taken into account. One of these effects is the result of extremely strong magnetic fields set up in the vicinity of the bars. Thus it must be ensured that the bars have sufficient mechanical strength to withstand the forces involved. By the present invention, the conductive sheets are separated not by air as is the usual case in bus bar systems but by solid virtually incompressible material. Thus the risk of mechanical failure is substantially reduced.

The other effect of short circuit currents is the thermal effect. Here again the absence of any marked skin effect reduces heating. In the short time during which short circuit conditions normally exist before correction, the effects of heat dissipation are not, however, significant. It has been found, however, that short term heat effects of short circuit currents are much lower than might be expected. One possible explanation of this is that current flowing between two stems or like connectors on a given conductive sheet follows a path the effective cross-sectional area of which can increase as the current increases, such increase of area being permitted by the comparatively large extent of the conductive sheet.

This same spreading of the current is believed also to reduce the mechanical forces due to the magnetic effects of short circuit conditions. This is particularly so under some conditions when there is magnetic interference between two sheets in both of which fault currents are flowing.

It has thus been found that, by the use of the invention, the amount of copper required in the distribution switchboard can be reduced very considerable when compared with a normal bus bar system. The saving of expenditure on copper is more than adequate to cover the cost of insulation, the provision of which is desirable even on normal bus bars (although complete insulation of bus bars has usually been avoided in a view of the expense involved).

As assembly as described above will also be more compact than an equivalent bus bar system.

In the example shown, the width of each of the conductive sheets is in the region of 24″ and the thickness of each is in the region of $\frac{1}{16}$″. The width/thickness ratio of the sheet is therefore some 384:1 in this case. The thickness of the insulating layers is $\frac{3}{32}$″. We also envisage the possibility of employing assemblies as small as 8 inches width and ¼″ thickness (the width/thickness ratio here is 32:1) and as large as 36 inches wide and $\frac{1}{64}$″ thickness (width/thickness ratio 2304:1). In general the thickness of the sheet to be used will be determined by the current to be carried and the width will be accordingly selected. We do not except that the full advantages of the invention will be obtainable if a width/thickness ratio of less than 32:1 is employed.

Figure 6:
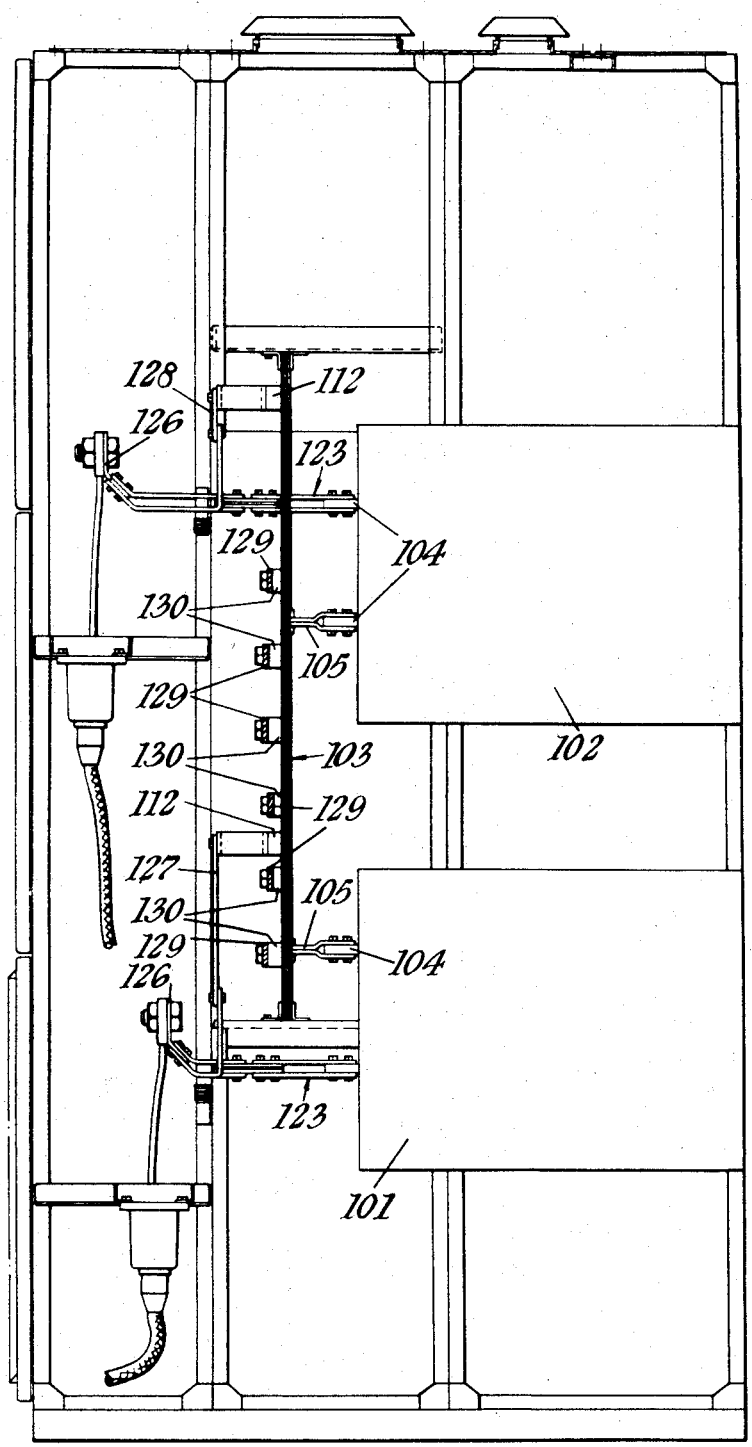
Figure 7:
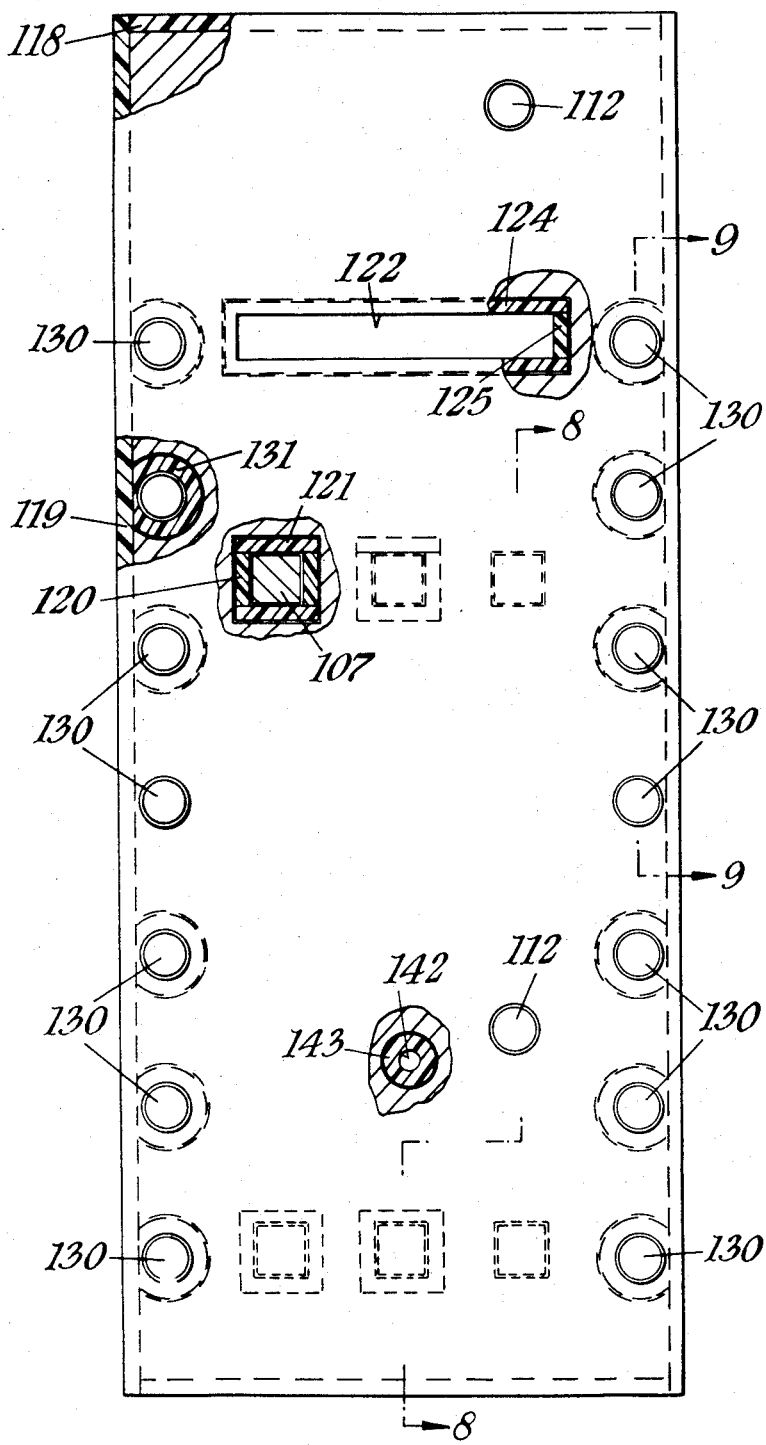
Figure 10:
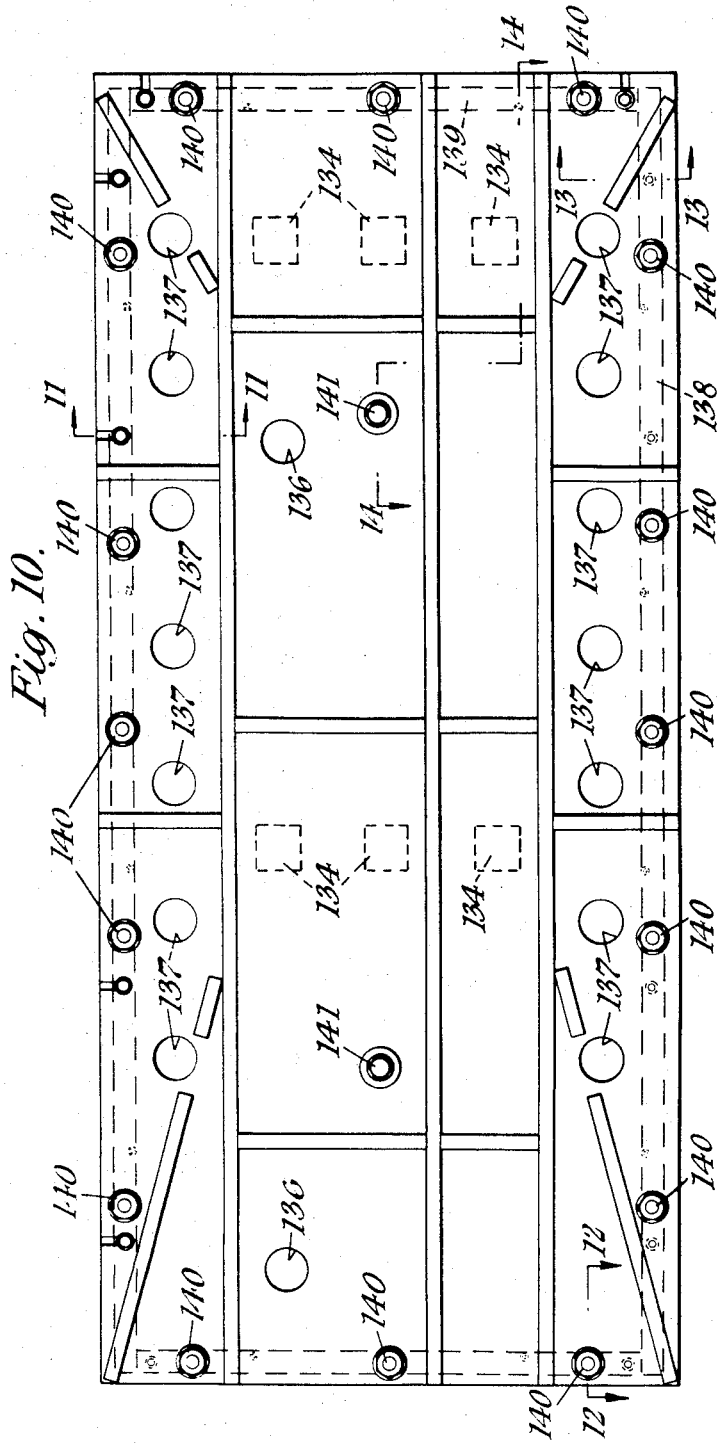
Figure 11:
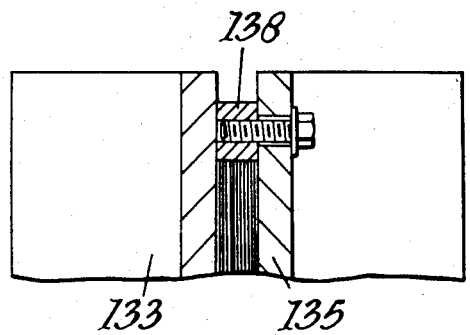
Figure 14:
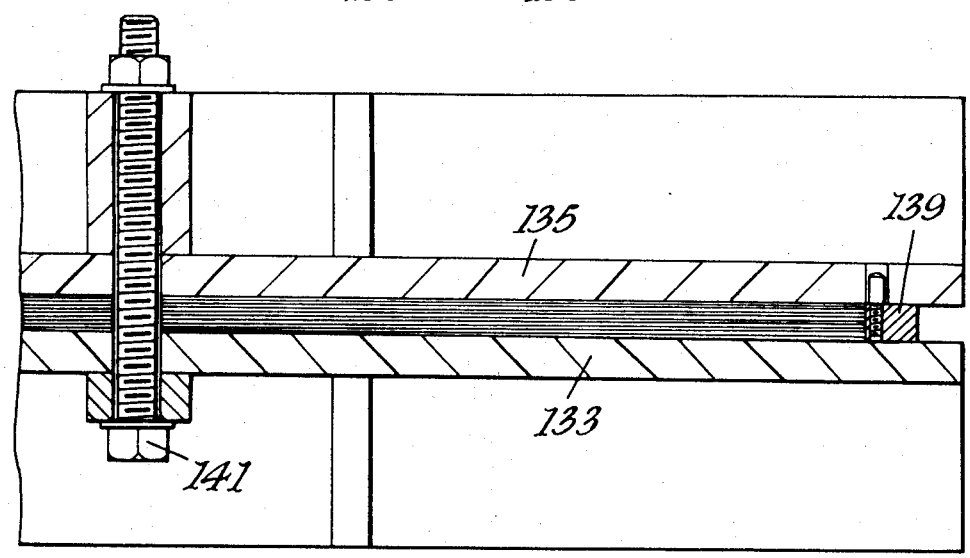
FIGURE 14 is a fragmentary section on line 14—14 in FIGURE 10.
Figure 12:
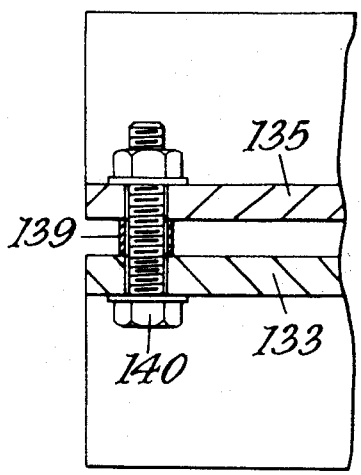
FIGURE 12 is a fragmentary section on line 12—12 in FIGURE 10.
Figure 13:
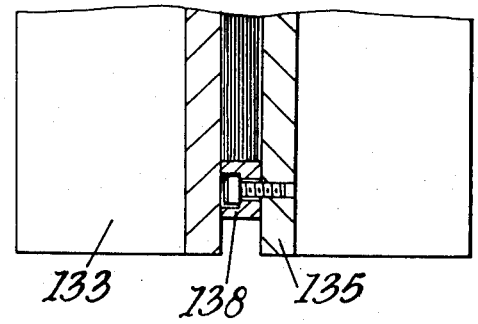
FIGURE 13 is a fragmentary section on line 13—13 of FIGURE 10.

FIGURES 6 and 6a show another switchboard arrangement in which each cell of the board contains just two switch devices 101, 102 arranged one above the other, so that when the cells are arranged side by side the switches are in two tiers. The supporting structure for the switch devices 101, 102 also supports a laminated bus assembly 103 the details of which are shown in FIGURES 7 and 8.

The switch devices 101, 102 have input terminals 104 in the form of blades projecting towards the laminated assembly 103. The assembly 103 has connectors 105 which project toward the switch devices. Each connector 105 consists of a pair of cranked blades 106 welded or brazed to a square base 107 which is in turn brazed to the appropriate conductive sheet 108, 109 or 110 in the laminated assembly 103. The fourth conductive sheet 111 in the assembly, which is in use connected to the neutral of the supply does not have connectors 105 for connection into the switches but, instead, has bosses 112 on its rear face. The purpose of these will be explained hereinafter.

The construction of the laminate is much the same as that described with reference to FIGURES 1 to 5. The conductive sheets 108, 109, 110 and 111 are sandwiched between insulating sheets 113, 114, 115, 116 and 117 (i.e., five in all). Both sets of sheets are rectangular in outline, but the insulating sheets are of larger surface dimensions than the conductive sheets. The insulating sheets thus project beyond the conductive sheets around the entire periphery of the laminate. Insulating strips 118, 119 extend around the edges of the conductive sheets between the insulating sheets.

Where the bases 107 of the connectors 105 are connected to the sheets 109 and 110 holes in the overlying conductive and insulative sheets are formed to receive the connectors. In the lower part of FIGURE 8, for instance the connector is attached to sheet 109. The holes in all the sheets are square in outline but the holes in the conductive sheet 108 are larger than those in the insulating sheets 113, 114. Thus the latter sheets project beyond the edges of the hole in the sheet 108. Washer means consistuted by flat strips 120, 121 are interposed between the sheets 113, 114 in the hole in sheet 108, thereby totally enclosing sheet 108 in this area. Where the connectors 105 are attached to the conductive sheet 110 the sheets 108 and 109 are given the same treatment as is described above.

Referring once again to FIGURES 6 and 6a the blades 104 of the switch devices are connected to the connectors 105 by inserting the former between the blades 106 of the latter and then bolting the three blades together.

The outgoing terminals 123 of the switches project, in the case of the switch 101, beneath the laminate 103, and, in the case of the switch 102, through a hole 122 in the laminate. This hole is formed in exactly the same manner as the holes for the connectors 105. Thus the holes formed in the conductive sheets are of larger dimensions than those formed in the insulative sheets and the difference is made up by flat strips 124, 125 lining the holes in the conductive sheets.

Since the neutral phase is not dealt with by the switch devices the bosses 112 on the neutral conductive sheet 111 are connected directly to the neutral outgoing terminals 126 of the board. These connections include removable conductive links 127, 128 for isolating terminals 126 when required.

Inter-cell connections between the laminates 103 are made, as in the example described with reference to FIGURES 1 to 5, by means of links 129 secured to bosses 130 on the conductive sheets adjacent, but slightly spaced from, the edges of the laminates 103. As before, substantially annular flat washers 131 are used, in the same manner as the strips 120, 121 to insulate the edges of holes in the conductive sheets from the penetrating bosses 130 of other sheets.

It should be noted that the terminal assembly enclosed within the chain dotted line 132 at the left-hand end of FIGURE 6a is repeated in each cell. The main supply to the switchboard is brought into one of the laminates (at one end of the board) via a main isolator switch or sometimes via a so-called bus-section switch, or sometimes by direct connection to a laminate 103. Thereafter current is transmitted along the switchboard by the laminates 103 via the links 129. The laminates thereby serve as combined bus bars and risers for the board. The manufacture of the laminate illustrated in FIGURES 7 to 9 will now be discussed with the assistance of FIGURES 10 to 14. Before assembly of the laminate is commenced the conductive sheets 108 to 111 are cut to size and have square and round holes punched or otherwise formed in them where required. A study of FIGURES 7 to 9 will quickly reveal the required positions of these holes to the skilled reader. The connectors 105 and the bosses 112 and 130 are then brazed to the conductors in the required positions. If necessary the sheets 108 to 111 are now straightened.

The insulating sheets 113 to 117 are also cut to size and have the appropriate holes formed therein. It will be remembered that the surface dimensions of the insulating sheets are larger than those of the conductive sheets and that the holes in the insulating sheets are smaller than the corresponding holes in the conductive sheets. A suitable supply of strips 118, 119, 120, 121, 124 and 125 and of washers 131 is laid in.

The jib shown in FIGURES 10 to 14 is employed both for straightening the conductive sheets and for assembly of the laminate. The jig consists of a lower platen 133 which is formed with square holes 134 arranged to receive the connectors 105, an upper platen 135 with holes 136 to receive bosses 112 and holes 137 to receive the bosses 130, and spacer strips 138, 139 removably mounted between the platens 133, 135. Various clamping bolts 140 are arranged adjacent the edges of the platens for applying clamping pressure thereto. In addition, in order to apply clamping pressure at the centre of the laminate, bolts 141 are engaged in holes on the centre lines of the platen. These bolts extend, in use through the hole 122 in the laminate and through a hole 142 therein, especially provided for this purpose. This hole has flat insulation washers 143 in oversize holes in the conductive sheets.

For straightening the conductive sheets, these are placed, one at a time, in the jig and the platens are clamped together and then released. For this operation the spacing strips 138, 139 are not required. All the conductive sheets and insulating components are now thoroughly degreased and assembly is begun.

The adhesive is in the form of a preformed film of nitrile rubber on a fabric carrier web. Such films are available commercially under the designation "Bostik Film Form Adhesive 415A11." The film is trimmed using a sharp knife with the first sheet 113 as a template. The sheet 113 with adhesive film adhering to it is then placed on the lower platen. The conductive sheet 108 and all of its associated strips, washers etc., is next placed over the adhesive film. The insulating sheet 114 with films of adhesive already adhering to both surfaces is now applied and the above steps are then repeated until the laminate is complete.

The upper platen is then positioned and the clamping bolts are tightend. The whole jig is then placed in an oven and heated up slowly to 150°C. to activate the adhesive. The heating process takes about three hours to ensure even heating of the entire laminate.

The bonded laminate is finally removed from the jig and all cut surfaces of the insulation material are treated with an anti-tracking varnish.

Figure 16:
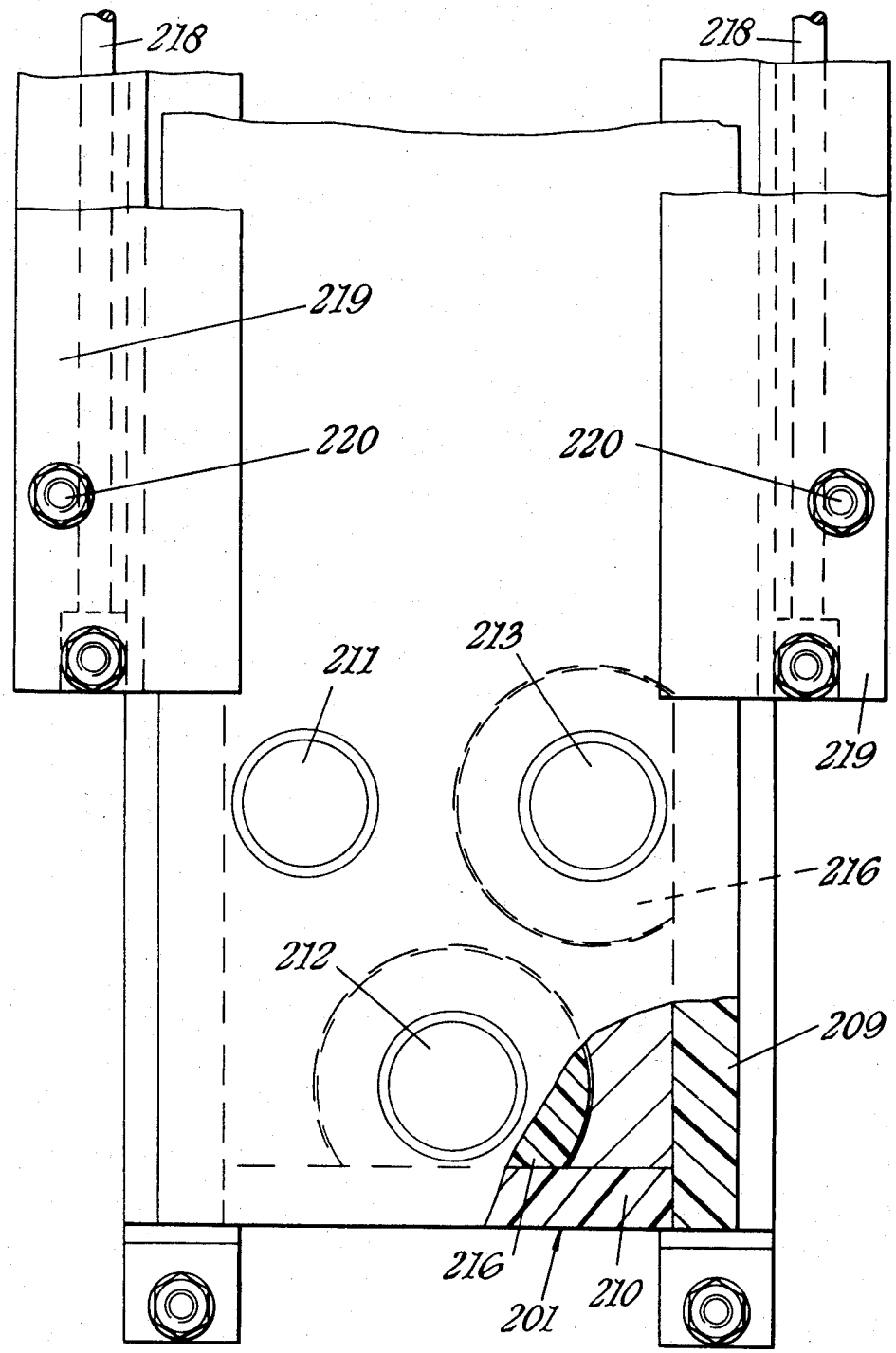
FIGURE 16 is a rear elevation of one end of the panel board of FIGURE 15.

FIGURES 15 to 17 illustrate the application of an example of the invention to a miniature circuit breaker panel board, in this particular case for eighty circuit breakers. The elongated laminate 201, is constructed in the same way as that used in the above described embodiments. There are only three conductive sheets 202, 203 and 204, which are sandwiched between insulation layers 205, 206, 207 and 208. Edge strips 209, 210 enclose the edges of the sheets.

There are three input terminals 211, 212, 213 secured to the sheets 202, 203, 204 respectively which are connected, in use, to the three phases of the supply. The input terminals are arranged at one end of the laminate and project from one side thereof. Terminal posts 214 for the circuit breakers 215 are arranged along the longitudinal centre line of the laminate to project from the opposite side thereof. The arrangements for insulating the terminals 212, 213 and the posts 214 from any conductive sheets through holes in which they pass are similar to the arrangements already described.

In the case of the terminals 212, 213 flat substantially annular washers 216 are employed, these being disposed in oversize holes in the conductors 202, 203. In the case of the posts 214 the washer means are made up of flat annual strips 217. In the sheet 204 the holes made are large enough to receive the posts 214 on both the underlying sheets 202, 203. The washer means here is shown in FIGURE 17 and consists of strips along the longitudinal edges of the hole, strips along the transverse edges of the hole and a further strip 217a extending between the longitudinal strips and separating the post 214 on sheet 202 from that on sheet 203. The washer means is thereby of "square" 8-shaped configuration. In the sheet 203, holes for the posts 214 of sheet 202 are required, the longitudinal strips in this case terminating at dotted line 217b in FIGURE 17.

The posts 214 are of channel shaped configuration with a base 214a brazed or soldered to the appropriate conductive sheet and with two lugs 214b for engagement by spring terminal clips on the circuit breakers 215, which are of the type manufactured by the Square D Company (although it is to be understood that similar arrangements could be employed for other types of miniature circuit breaker). As shown in FIGURE 15 the circuit breakers are arranged in pairs on the board.

For retaining the circuit breakers 215 a pair of rods 218 extend along the longitudinal edges of the laminate 201. These rods 218 are supported on metal edging strips 219 clamped to the edges of the laminate 201 by means of bolts and nuts 220. As shown in FIGURE 15 each of the circuit breakers 215 has a clip 215a which engages the rod 218. The casing of the circuit breaker 215 rests on the edging strip 219.

Output connections to the circuit breakers 215 are made directly by wires 221 and do not affect the laminate 201. It will be noted that the posts 214 are uniformly spaced along the length of the laminate. The panelboard can thus be used either for single phase breakers or three phase breakers as is known in the art.

Figure 18:
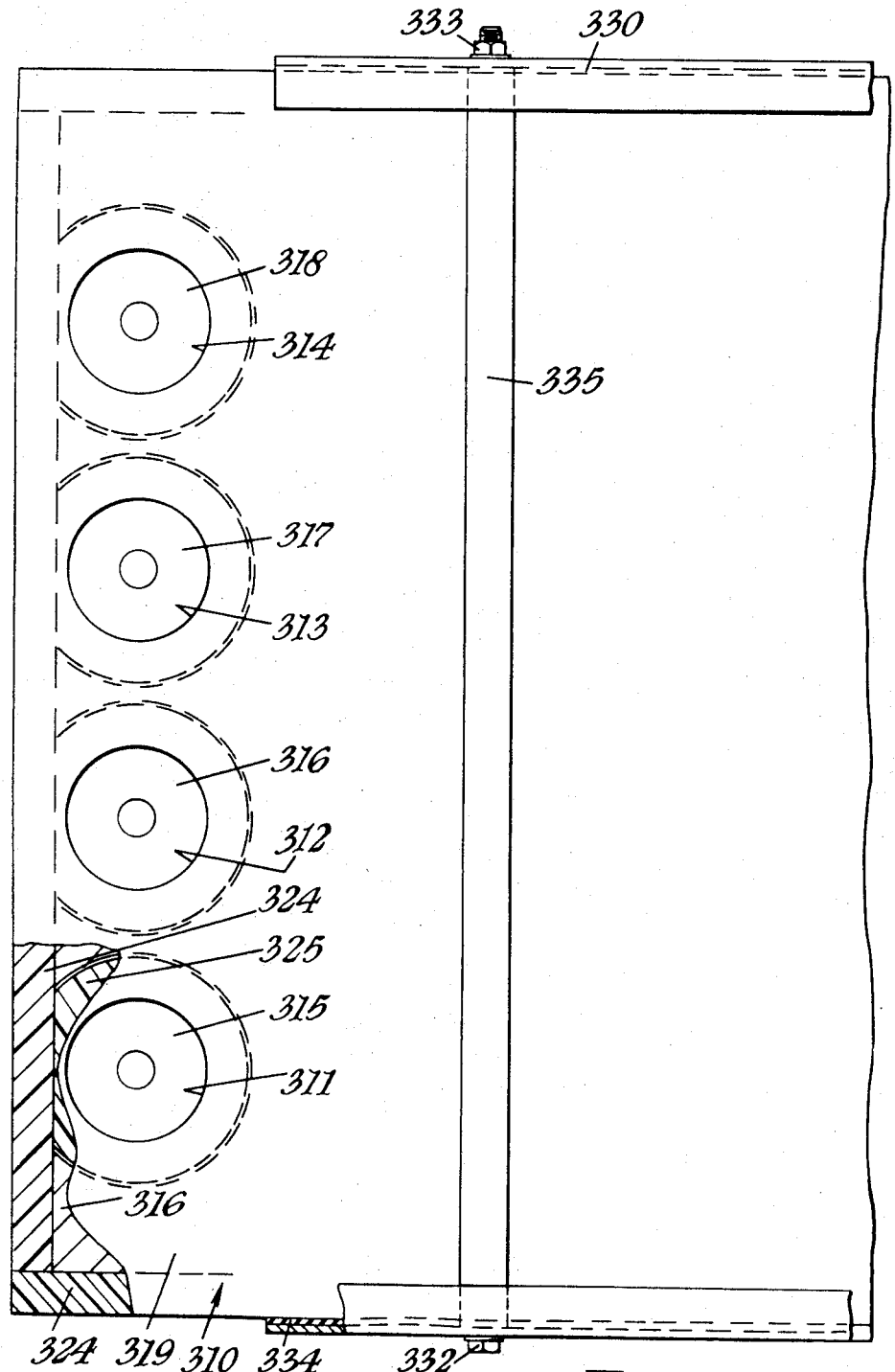
FIGURE 18 is an elevation, partly in section of one end of laminate for use in bus bar trunking.

FIGURES 18 and 19 illustrate one example of the invention as applied to bus bar trunking or bus duct. The general construction of the laminates 310 utilised in this connection is exactly the same as that used for the laminates in the above described switchboard applications except that there are no connectors permanently secured by brazing to the individual conductors. There are no tappings shown from the centres of the laminates, which are of relatively narrow, elongated form. In some cases the laminates may have centre tappings to allow fuseboxes etc., to be plugged in.

As shown in FIGURE 18 the laminate 310 has four openings 311, 312, 313 and 314 at its end, exposing areas of the four conductive sheets 315, 316, 317 and 318 respectively. These sheets are sandwiched, as before, between sheets of insulating material 319, 320, 321, 322 and 323. The insulating sheets have larger surface dimensions than the conductive sheets, and the holes in the former are smaller than the holes in the latter. The peripheral edges of the conductive sheets are protected by insulation strips 324 and the edges of the holes therein are protected by flat insulating washers 325 as before.

The laminates 310 differ from those previously described in one repscet. Where areas of the conductive sheets are exposed for connection holes are formed in all the other sheets on both sides of the particular conductive sheet in question. This enables the joint construction illustrated in FIGURE 19 to be employed. The joint makes use of four tubular bushes 326, four bolts 327, four nuts 328 and four pairs of flat washers 329.

As shown, in FIGURE 19 the bush 326 is clamped between the corresponding conductive sheets 315 of the two laminates 310, which lie in an overlapping relationship. The washers 329, which are of the same external diameter as the bush 326, underlie the head of the bolt 327 and the nut 328 respectively and serve to spread the clamping load, applied by the nut and bolt combination out to the periphery of the bush 326. The ends of the bush are not completely flat but each has an annular rim 326a so that maximum pressure is applied to this rim when the bolt 327 is tightened.

The laminates are provided with a simple protective arrangement employing channels 330 along the edges of the laminates and covers 331 protecting the joints. The channels 330 are held in place by the bolts 332 extending between the channels and nuts 333 on the tie bolts, drawing the channels into clamping engagement with seating strips 334 laid along the edges of the laminates. Sleeves 335 may be located on the bolts 332 between the channels to limit tightening thereof.

As will be seen from FIGURE 19, the channels are offset on the laminates so that when two laminates 310 are joined, as shown, in overlapping relationship, the channels on the two laminates are aligned.

The covers 331 are mounted in any convenient way and may comprise steel or like pressings coated with epoxy resin or other insulation material. Each cover has a long flange 331a at one end and a shorter flange 331b at the other end. These project respectively towards the two laminates 310 so that no appreciable gaps are left for the entry of foreign matter.

Turning now to FIGURES 20 and 21, the construction shown is essentially the same as that forming the subject of FIGURES 18 and 19. In the present case, however, the laminates 410 are of narrower configuration, being intended for use in carrying somewhat lower currents. As a result it is not possible to arrange all four connections along the extreme end of the laminates. Thus, as shown, in FIGURE 20, the holes 411, 412, 413 and 414 are arranged at the corners of an imaginary square. The laminates 410 overlap to a sufficient degree to align the four holes at one end of one laminate with the four holes at the corresponding end of the adjacent laminate 410. The connections between the conductive sheets and the protective channels and covers are as described above.

It will be appreciated that T-joints, X-joints and L-joints can simply be made with the laminates 410 if required. There may be a change in the phase rotation at the joint, but this can be allowed for.

Figure 22:
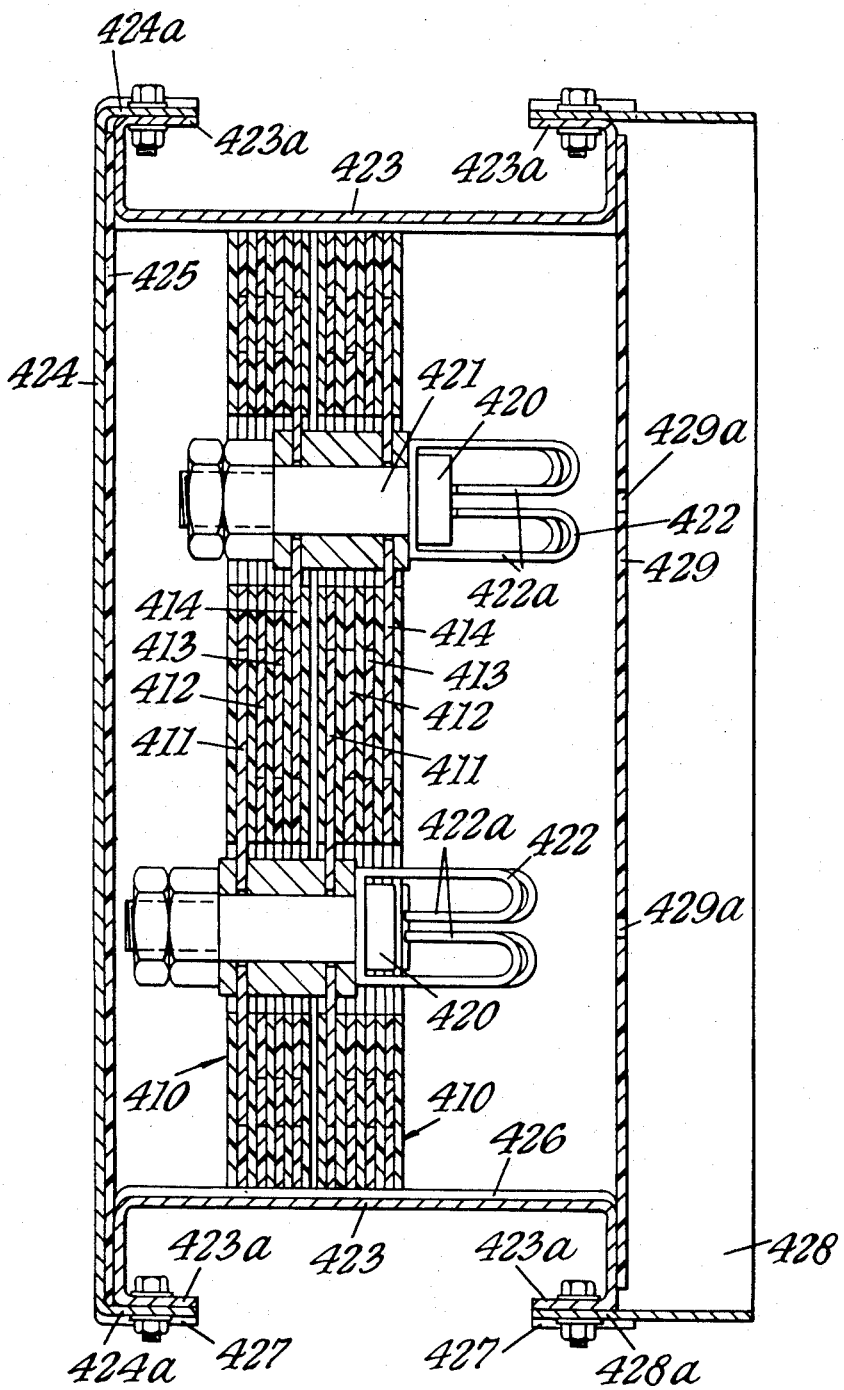
FIGURE 22 is a section, taken perpendicularly to the section of FIGURE 21 but showing the joint thereof modified to receive a plug-in fuse-box and also showing a modified form of enclosure for the laminates forming the bus bar trunking.

As shown in FIGURE 22, the arrangement of FIGURES 20 and 21 can be employed for plug-in fused connectors. FIGURE 22 is a vertical section through the joint, which is substantially the same as is shown in FIGURE 21 except that the bolts 420, which pass through the hollow bushes 421 to clamp the conductors to the latter, also serve to mount contact blades 422. These blades are formed from resilient metal strip bent to the configuration shown, which is basically U-shaped with inturned contact fingers 422a directed towards the base of the U from the ends of the limbs thereof. There are thus four of the contact blades 422 which are arranged at the corners of the square and which are connected respectively to the conductive sheets 411, 412, 413 and 414.

The covers for the joint comprise a pair of channels 423 with inturned flanges 423a and a pair of sheet members like member 424 which has flanges 424a bolted to the flanges 423a. The sheet member 424 is lined with a sheet 425 of insulating material.

The enclosure for the laminates if made up, similarly, from channels 426, of the same shape as channels 423, but of internal dimensions sufficient to receive the latter telescopically, and sheet members 427 (only the flanges of which are visible in FIGURE 22). The faces of the sheet members 424 and 427 are co-planar throughout straight runs of the trunking, whilst the cover channels 423 are bolted to the enclosure channels 426 to make up a rigid structure.

Figure 23:
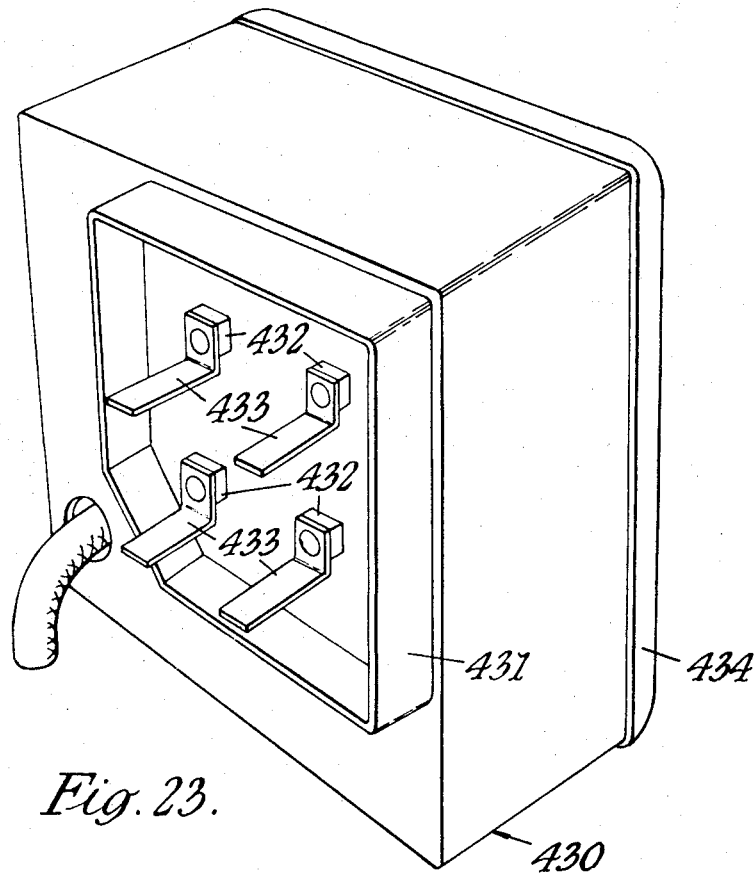
FIGURE 23 is a perspective view of the plug-in fuse-box used with the joint of FIGURE 22.

In FIGURE 23 one of the sheet members 424 has been removed and replaced by an escutcheon member 428. This has flanges 428a which serve the same purpose as the flanges 424a. An insulative sheet 429 is fixed across the opening in the escutcheon member 428 and has holes 429a overlying the contact blades 422.

The fuse box 430 shown in FIGURE 23 has a locating rim 431 adapted to fit into the opening of the escutcheon member 428. Mounted on the base of the fuse box on insulating spacers 432 are four contact blades 433 arranged to pass through the holes 429a in the insulative sheet 429 and to engage and be gripped by the blades 422 at the joint between the laminates 410.

The interior of the fuse box contains conventional fuse carriers for the three phases and a neutral link. Access to the interior is gained by removal of a lid 434 on the box.

If desired contact blades 422 may be mounted, in square formations, on the laminates at intervals along the lengths thereof, thereby enabling connections to be made, wherever required, to the conductive sheets.

Although all the laminates described above are made up by actual interleaving of conductive and insulating sheets, it is also within the terms of reference hereof to make the laminates by a moulding or casting process. In this way the insulation material is a monolithic structure.

Figure 24:
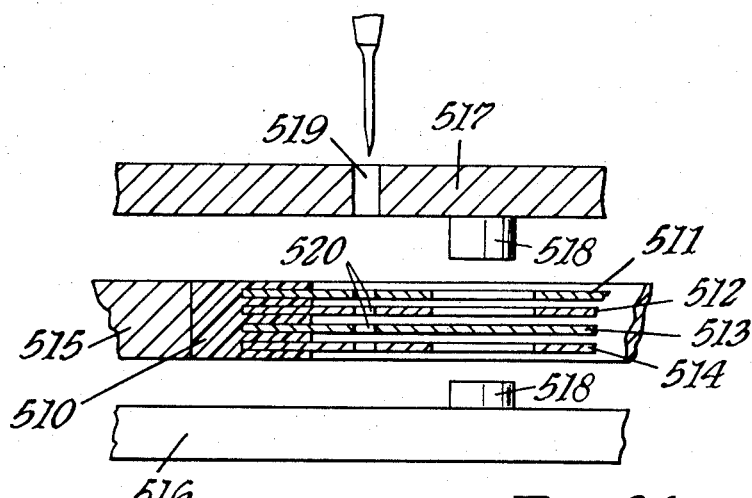
FIGURE 24 is a diagram illustrating the manufacture of laminates by integral moulding or casting of insulation material.

An example of such manufacture is illustrated in FIGURE 24, where a laminate, for use as described above, in bus bar trunking, is being prepared. The process makes use of extruded plastic strip 510 which has four deep grooves to receive the longitudinal edges of the conductors 511, 512, 513 and 514. The material chosen for the strips 510 is such that it adheres strongly to the resin used for moulding or casting. The strips 510 do not extend across the end edges of the conductors.

The sub-assembly consisting of the two strips 510 and the four conductors are positioned in a suitable mould, which, in the present case, is shown as consisting of an edge frame 515 and a pair of plates 516, 517. The edge frame is so shaped that the sheets 511 to 514, held in spaced relation by the strips 510, do not abut the frame at their ends. The mould plates 516, 517 have pegs 518 thereon which project into the holes in the conductive sheets and engage against the sheet (in this case sheet 513) which is to be exposed by the particular hole. The pegs 518 are of lesser diameter than the holes in the sheets.

The resin is poured into the mould cavity (in the example shown, through a hole 519 in the upper mould plate 517) and the mould is filled slowly to enable air to escape under vacuum from the interior of the mould. Holes 520 may be formed in the conductive sheets to allow the resin to fill the mould and the air to escape.

In the finished product, the washers and the edge strips at the ends of the laminate will be integral with the insulating sheets. The edge strips along the longitudinal edges of the laminate are replaced by the strips 510.

Having thus described our invention what we claim as new and desire to secure by Letters Patent is:

1. A laminate for use in an electrical distribution system comprising a pluarity of thin sheets of electrically conductive material, insulation material interposed between said sheets and firmly bonded thereto, a pair of outer layers of insulation material firmly bonded respectively to a pair of the conductive sheets, strips of insulation material connected to the interposed insulation material and to the outer layers and extending around the entire perimeter of the conductive sheets totally to enclose the perimetric edges of the conductive sheets in insulation material, at least one outer layer of insulation material having a plurality of holes which are spaced from the edge of the laminate, and holes in the conductive sheet bonded to said one outer layer to underlie some of the holes in said one outer layer and to overlie holes in said interposed insulation material so as to expose a conductive sheet spaced from said one outer layer, the holes in the conductive layer being of larger dimensions than those in the insulating material, and flat portions of insulation material in said holes in the conductive sheets, so that each conductive sheet is totally enclosed in insulation material except where exposed by the holes penetrating thereto.

2. A laminate as claimed in claim 1, in which the interposed insulation material and the outer layers of insulation material are sheets of surface dimensions greater than those of the conductive sheets and said strips of insulation material are located between the insulating sheets.

3. A laminate as claimed in claim 1 further comprising connecting means permanently connected to the conductive sheets and projecting from said one outer layer.

4. A laminate as claimed in claim 3 in which the holes in said one outer layer are adjacent an edge thereof and further comprising connecting links secured to the connecting means for connection to another, similar laminate placed in edge to edge relationship with the laminate, whereby the conductive sheets of one laminate are respectively electrically connected to the conductive sheets of the other laminate.

5. A laminate as claimed in claim 1 in which holes penetrate the laminate from both sides thereof so that at each hole, the associated conductive sheets are exposed on both surfaces.

6. A laminate for use in an electrical distribution system comprising a plurality of rectangular sheets of conductive material arranged in a spaced parallel relationship, a plurality of sets of electrically conductive stems permanently united respectively to the conductive sheets and projecting therefrom, the conductive sheets having aligned holes through which said stems on underlying sheets project, and the stems and holes being distributed over the areas of the sheets, a plurality of connector means permanently united respectively with the conductive sheets adjacent to but spaced from one edge of each and projecting therefrom in the direction opposite said stems, the conductive sheets having holes adjacent said edge through which the connector means on overlying sheets projects, layers of insulating material interposed between the conductive sheets and each firmly bonded to the two adjacent conductive sheets, a pair of outer layers of insulation material bonded firmly to the conductive sheets, each insulating layer being of larger surface dimensions than the conductive sheets, strips of insulating material located between adjacent layers of insulating material and the perimeters of the conductive sheets for totally insulating the perimetric edges of the conductive sheets, said layers of insulating material having holes through which the stems and connector means extend, said holes being of smaller dimensions than the holes in the conductive sheets, flat washers of insulating material located between the insulating layers and in the holes in the conductive sheets so that the conductive sheets are totally enclosed in insulating material except where the stems and connector means are united therewith, and conductive links adapted to be connected to the connector means and those of a similar laminate placed in edge to edge relationship with the laminate to interconnect the respective conductive sheets of the two laminates.

7. A system of electrical conductors for the transmission of poly phase electric power comprising a plurality of laminates of rectangular form arranged in a co-planar edge to edge relationship; each laminate comprising a plurality of sheets of conductive material, a plurality of layers of insulation material interposed between the conductive sheets and a pair of outer layers of insulation material between which the conductive sheets and the interposed layers of insulation material are sandwiched, all the layers of insulation material being firmly bonded to the conductive sheets to rigidify the laminate, strip means connected to the layers of insulation material and extending around the entire perimeter of the laminate to enclose the entire perimetric edges of the conductive sheets in insulation material, one of said outer layers being formed adjacent each of two opposite edges with a series of holes spaced along said edges, the conductive sheet bonded to said one outer layer being formed with holes less in number than those in said one outer layer and aligned with certain of the holes in said one outer layer, the interposed layer of insulation material bonded to said conductive sheet being formed with holes aligned with the holes in the conductive sheet and so on through the laminate so that at least one area of each conductive sheet is exposed through one of the holes in said outer layer, and washer portions of insulation material interposed between the layers of insulation material within the holes in the conductive sheets so that the conductive sheets are totally enclosed in insulation material except where exposed as aforesaid; and link means interconnecting the conductive sheets of each laminate with the respective conductive sheets of its neighbour with said link means extending into the holes formed in said outer layer.

8. A system as claimed in claim 7 in which said link means comprises connector means permanently united with the respective conductive sheets and projecting from the laminate and conductive links bolted to the said connector means of adjacent laminates.

9. A system as claimed in claim 8 in which said connector means are spaced from said holes by air gaps.

10. A system of electrical conductors for the transmission of poly phase electric power comprising a plurality of laminates of elongated rectangular form arranged in an overlapping relationship; each laminate comprising a plurality of sheets of conductive material, a plurality of layers of insulation material interposed between the conductive sheets and a pair of outer layers of insulation material between which the conductive sheets and the interposed layers of insulation material are sandwiched, all the layers of insulation material being firmly bonded to the conductive sheets to rigidify the laminate, strip means connected to the layers of insulation material and extending around the entire perimeter of the laminate to enclose the entire perimetric edges of the conductive sheets in insulation material, one of said outer layers being formed adjacent each of two opposite edges with a series of holes spaced along said edges, the conductive sheet bonded to said one outer layer being formed with holes less in number than those in said one outer layer and aligned with certain of the holes in said one-outer layer, the interposed layer of insulation material bonded to said conductive sheet being formed with holes aligned with the holes in the conductive sheet and so on through the laminate so that at least one area of each conductive sheet is exposed through one of the holes in said outer layer, and washer portions of insulation material interposed between the layers of insulation material within the holes in the conductive sheets so that the conductive sheets are totally enclosed in insulation material except where exposed as aforesaid; and connector means clamped between the laminates, within said holes in the insulation layers and washer portions, and interconnecting the conductive sheets of each laminate to the respective conductive sheets of the overlapping laminates.

11. A system as claimed in claim 10 in which each laminate has holes on both sides to expose both faces of the conductive sheets at each hole, said connector means comprising hollow bushes interposed between the conductive sheets within the holes; and further comprising clamping means comprising bolts extending through openings in the conductive sheets and through said bushes, and nuts on the respective bolts clamping the conductive sheets to the bushes.

12. A system as claimed in claim 11 further comprising contact blades carried by said bolts for engagement with contacts on a plug-in fuse box.

13. A system as claimed in claim 10 further comprising enclosures for the laminates and covers for the joints between the laminates; said enclosures each incorporating a pair of channel members extending along the edges of the enclosed laminate and a pair of sheet members extending between said channel members on opposite sides of the laminate, said channel members having inturned flanges; and said covers each incorporating a pair of channel members the ends of which are telescopically received by and secured to the ends of the channels of adjoining enclosures, and a pair of sheet members extending between the channel members of the covers to enclose the joint.

14. An electrical distribution board for controlling the connection of a plurality of electrical circuits to a common supply comprising a supporting structure; a plurality of switch devices on said structure, each switch device including a plurality of incoming terminals, a plurality of outgoing terminals and means for connecting and disconnecting the outgoing terminals to and from the incoming terminals; a single laminate on said supporting structure comprising a plurality of thin extensive sheets of conductive material arranged in a spaced apart relationship and layers of insulation material interposed between and enclosing the sheets of conductive material, said insulation layers being firmly bonded to the conductive sheets; connector means connecting the incoming terminals of the switch devices to the respective conductive sheets of the laminate; supply terminal means connected to the respective conductive sheets of the laminate; said connector means and said supply terminal means extending through holes in the enclosing layers of insulation material at positions spaced from the edges of the laminate and through holes in the conductive sheets of larger dimensions than the holes in the insulation material layers; and flat washer portions of insulation material within said holes in the conductive sheets located between the adjacent layers of insulation material so that the conductive sheets are completely enclosed within insulation material except where connected to said connector means and terminal means.

15. An electrical distribution board as claimed in claim 14 in which said connector means comprises conductive members permanently united with the respective conductive sheets.

16. An electrical distribution board as claimed in claim 14 in which the outgoing terminals of at least some of said switch devices extend through passages formed in the laminate, said passages being formed by aligned holes in the insulation material layers and washers located between adjacent insulation material layers within larger holes in the conductive sheets.

17. An electrical distribution board for controlling the connection of a plurality of independent circuits to a common supply, comprising, in combination, a supporting structure, a plurality of switch devices supported on said structure and each including an incoming terminal, an outgoing terminal and means for connecting and disconnecting the outgoing terminals to and from the incoming terminals; a single laminate on said structure comprising a plurality of thin extensive sheets of conductive material arranged in spaced relation and layers of insulation material interposed between and substantially enclosing the sheets of conductive material, said insulation layers being firmly bonded to the conductive sheets; connector means connecting the incoming terminals of the switch devices to the respective conductive sheets of the laminate; further connector means connected to the respective conductive sheets and arranged in spaced relationship adjacent one edge of the laminate for connection to similar further connector means on an adjacent distribution board or like construction, said connector means and said further connector means extending through holes in the enclosing layers of insulation material at positions spaced from the edges of the laminate and through holes in the conductive sheets of larger dimensions than the holes in the insulation layer; flat washer portions of insulation material within said holes in the conductive sheets located between the adjacent layers of insulation material, and supply terminal means connected to the respective conductive sheets.

18. An electrical distribution board as claimed in claim 17 in which said connector means and said further connector means are in the form of conductive members permanently united with the conductive sheets, the connector means projecting from one side of the laminate towards the switch devices and the further connector means projecting from the other side of the laminate.

19. In an electrical distribution board comprising a plurality of switch devices supported in spaced relationship and respectively controlling the supply of electric power to a plurality of circuits, a laminate comprising a plurality of thin extensive sheets of electrically conductive material, a plurality of layers of insulation material separating and enclosing said conductive sheets, said conductive sheets and said insulation layers being firmly bonded together to rigidify the laminate, strip means of insulation material attached to said insulation layers and substantially totally enclosing the perimetric edges of said conductive sheets, a plurality of sets of connector means permanently attached to the conductive sheets and projecting from one face of the laminate towards said switches, said connector means extending through holes in the insulating material and through aligned larger holes in the conductive sheets, flat washer means of insulating material disposed within the holes in the conductive sheets so as to insulate the latter from the connector means, said connector means being electrically connected to terminals of said switches, and input terminal means whereby the respective conductive sheets of the laminate are connected to a source of electric power.

20. An assembly for use in an electrical distribution system comprising at least a pair of spaced sheets of conductive material, a layer of insulating material between the sheets, outer layers of insulating material, the layers having apertures to expose the conductive sheeets, the holes in the layers penetrating to expose the layers of conductive material, the holes in the layers of conductive material being larger than the holes in the layers of insulating material, flat rings of insulating material being disposed in the holes in the conductive layers, electrical connectors attached to the conductive layers and extending outwardly via the holes, and the conductive sheets and the insulating layers being bonded together.

21. An assembly for use in an electrical distribution system comprising a plurality of spaced apart rectangular sheets of insulating material, a plurality of relatively thin sheets of conductive material interposed between the sheets of insulating material and adhesively bonded thereto, the sheets of conductive material being of smaller dimensions than the sheets of insulating material, strips of insulating material interposed between adjacent sheets of insulating material to insulate the edges of the conductive sheets, the insulating layers having holes to expose areas of the conductive sheets, the overlying conductive layers having larger aligned holes with the holes in the insulating layers and flat washers of insulating material disposed in said larger holes, and electrical connectors extending outwardly via holes.

22. An assembly as claimed in claim 21 in which the ratio of width:thickness of the conductive sheets is in excess of 32:1.

23. An assembly as claimed in claim 22 in which said ratio is in the vicinity of 384:1.

24. The assembly of claim 21 wherein said electrical connectors are of smaller diameter than the holes to leave surrounding air gaps between the layers and the connectors.

References Cited
UNITED STATES PATENTS

| 2,632,039 | 3/1953 | Hammerly et al. | 317—119 |
| 3,178,668 | 4/1965 | Weimer et al. | 339—22 |
| 2,733,289 | 1/1956 | Warren et al. | 317—120 XR |

OTHER REFERENCES

IBM Technical Disclosure Bulletin, "Electrical Connection Device," vol. 9, No. 4, September 1966, p. 361.

ROBERT K. SCHAEFER, *Primary Examiner.*

M. GINSBURG, *Assistant Examiner.*